United States Patent
Friedrichs et al.

(10) Patent No.: US 10,616,264 B1
(45) Date of Patent: *Apr. 7, 2020

(54) INCIDENT RESPONSE MANAGEMENT BASED ON ASSET CONFIGURATIONS IN A COMPUTING ENVIRONMENT

(71) Applicant: Splunk Inc., San Francisco, CA (US)

(72) Inventors: Oliver Friedrichs, Woodside, CA (US); Atif Mahadik, Fremont, CA (US); Govind Salinas, Sunnyvale, CA (US); Sourabh Satish, Fremont, CA (US)

(73) Assignee: Splunk Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/182,914

(22) Filed: Nov. 7, 2018

Related U.S. Application Data (63) Continuation of application No. 15/699,454, filed on Sep. 8, 2017, now Pat. No. 10,158,663, which is a (Continued)

(51) Int. Cl.
*H04L 29/06* (2006.01)
*G06F 21/55* (2013.01)
(Continued)

(52) U.S. Cl.
CPC ........ *H04L 63/1441* (2013.01); *G06F 16/285* (2019.01); *G06F 21/554* (2013.01); (Continued)

(58) Field of Classification Search
CPC . H04L 63/20; H04L 63/0236; H04L 63/0272; H04L 63/1416; H04L 63/1425; H04L 63/1433; H04L 63/1441
See application file for complete search history.

(56) References Cited

U.S. PATENT DOCUMENTS 6,405,318 B1 6/2002 Rowland et al.
7,076,803 B2 7/2006 Bruton, III et al.
(Continued)

OTHER PUBLICATIONS

Paudice, Andrea; Sarkar, Santonu; Cotroneo, Dominco; "An Experiment with Conceptual Clustering for the Analysis of Security Alerts", IEEE International Symposium on Software Reliability Engineering Workshops, Nov. 3-6, 2014, pp. 335-340.
(Continued)

*Primary Examiner* — Hosuk Song
(74) *Attorney, Agent, or Firm* — Nicholson De Vos Webster & Elliott LLP (57) ABSTRACT

Systems, methods, and software described herein enhances how security actions are implemented within a computing environment. In one example, a method of implementing security actions for a computing environment comprising a plurality of computing assets includes identifying a security action in a command language for the computing environment. The method further provides identifying one or more computing assets related to the security action, and obtaining hardware and software characteristics for the one or more computing assets. The method also includes translating the security action in the command language to one or more action procedures based on the hardware and software characteristics, and initiating implementation of the one or more action procedures in the one or more computing assets.

30 Claims, 5 Drawing Sheets

Related U.S. Application Data continuation of application No. 14/689,973, filed on Apr. 17, 2015, now Pat. No. 9,762,607.

(60) Provisional application No. 62/087,025, filed on Dec. 3, 2014, provisional application No. 62/106,830, filed on Jan. 23, 2015, provisional application No. 62/106,837, filed on Jan. 23, 2015.

(51) Int. Cl.
*G06F 16/28* (2019.01)
*H04L 12/851* (2013.01)

(52) U.S. Cl.
CPC ...... *H04L 63/0236* (2013.01); *H04L 63/1416* (2013.01); *H04L 63/1425* (2013.01); *H04L 63/1433* (2013.01); *H04L 63/20* (2013.01); *H04L 47/2425* (2013.01)

(56) References Cited

U.S. PATENT DOCUMENTS

| | | | |
|---|---|---|---|
| 7,127,743 B1 | 10/2006 | Khanolkar et al. | |
| 7,174,566 B2 | 2/2007 | Yadav et al. | |
| 7,469,301 B2 * | 12/2008 | Daniell | G06Q 10/107 709/202 |
| 7,900,259 B2 | 3/2011 | Jeschke et al. | |
| 7,950,056 B1 | 5/2011 | Satish et al. | |
| 8,042,171 B1 | 10/2011 | Nodstrom et al. | |
| 8,103,875 B1 | 1/2012 | Ramzan | |
| 8,146,147 B2 * | 3/2012 | Litvin | H04L 63/0263 709/225 |
| 8,185,953 B2 | 5/2012 | Rothstein et al. | |
| 8,261,317 B2 | 9/2012 | Litvin et al. | |
| 8,291,495 B1 | 10/2012 | Burns et al. | |
| 8,402,540 B2 * | 3/2013 | Kapoor | G06F 9/505 726/23 |
| 8,484,338 B2 | 7/2013 | Paster | |
| 8,516,575 B2 | 8/2013 | Burnside et al. | |
| 8,627,466 B2 | 1/2014 | Fisher et al. | |
| 8,676,970 B2 | 3/2014 | Boyns et al. | |
| 8,756,697 B2 | 6/2014 | Ocepek et al. | |
| 8,856,910 B1 | 10/2014 | Rostami-Hesarsorkh et al. | |
| 8,914,878 B2 | 12/2014 | Burns et al. | |
| 8,924,469 B2 | 12/2014 | Raleigh et al. | |
| 8,943,123 B2 | 1/2015 | Miyazaki et al. | |
| 8,949,931 B2 | 2/2015 | Ermagan et al. | |
| 9,009,824 B1 | 4/2015 | Chen et al. | |
| 9,049,226 B1 | 6/2015 | Duane | |
| 9,166,995 B1 | 10/2015 | Roundy | |
| 9,256,739 B1 | 2/2016 | Roundy et al. | |
| 9,311,479 B1 | 4/2016 | Manni et al. | |
| 9,325,733 B1 | 4/2016 | Kolman et al. | |
| 9,338,181 B1 | 5/2016 | Burns et al. | |
| 9,489,516 B1 | 11/2016 | Lu et al. | |
| 9,762,607 B2 * | 9/2017 | Satish | G06F 16/285 |
| 10,158,663 B2 * | 12/2018 | Satish | G06F 16/285 |
| 2004/0003286 A1 | 1/2004 | Kaler et al. | |
| 2004/0054498 A1 | 3/2004 | Shipp | |
| 2004/0111637 A1 | 6/2004 | Baffes et al. | |
| 2005/0055578 A1 | 3/2005 | Wright et al. | |
| 2005/0235360 A1 | 10/2005 | Pearson | |
| 2006/0048209 A1 | 3/2006 | Shelest et al. | |
| 2006/0117386 A1 | 6/2006 | Gupta et al. | |
| 2008/0005782 A1 | 1/2008 | Aziz | |
| 2008/0082662 A1 | 4/2008 | Dandliker et al. | |
| 2008/0289028 A1 | 11/2008 | Jansen et al. | |
| 2010/0162347 A1 | 6/2010 | Barile | |
| 2010/0251329 A1 | 9/2010 | Wei | |
| 2010/0319004 A1 | 12/2010 | Hudson et al. | |
| 2010/0325685 A1 | 12/2010 | Sanbower | |
| 2012/0331553 A1 | 12/2012 | Aziz et al. | |
| 2013/0007882 A1 | 1/2013 | Devarajan et al. | |
| 2013/0081141 A1 | 3/2013 | Anurag | |
| 2013/0291106 A1 | 10/2013 | Simonoff et al. | |
| 2013/0312092 A1 | 11/2013 | Parker | |
| 2014/0082726 A1 | 3/2014 | Dreller et al. | |
| 2014/0137257 A1 | 5/2014 | Martinez et al. | |
| 2014/0165207 A1 | 6/2014 | Engel et al. | |
| 2014/0237599 A1 | 8/2014 | Gertner et al. | |
| 2014/0259170 A1 | 9/2014 | Amsler | |
| 2014/0310811 A1 | 10/2014 | Hentunen | |
| 2014/0344926 A1 | 11/2014 | Cunningham et al. | |
| 2014/0351441 A1 | 11/2014 | Madani et al. | |
| 2015/0215325 A1 | 7/2015 | Ogawa | |
| 2015/0222647 A1 | 8/2015 | Lietz et al. | |
| 2015/0334132 A1 | 11/2015 | Zombik et al. | |
| 2015/0341384 A1 | 11/2015 | Mandayam et al. | |
| 2015/0365438 A1 | 12/2015 | Carver et al. | |
| 2015/0381641 A1 | 12/2015 | Cabrera et al. | |
| 2016/0006749 A1 | 1/2016 | Cohen et al. | |
| 2016/0072836 A1 | 3/2016 | Hadden et al. | |
| 2016/0103992 A1 | 4/2016 | Roundy et al. | |
| 2016/0119379 A1 | 4/2016 | Nadkarni | |
| 2016/0164893 A1 | 6/2016 | Levi | |
| 2017/0237762 A1 | 8/2017 | Ogawa | |

OTHER PUBLICATIONS

Aguirre, Idoia; Alonso, Sergio; "Improving the Automation of Security Information Management: A Collaborative Approach", IEEE Security & Privacy, vol. 10, Issue 1, Oct. 25, 2011, pp. 55-59.

Non-Final Office Action from U.S. Appl. No. 16/107,972, dated Dec. 31, 2018, 11 pages.

Non-Final Office Action from U.S. Appl. No. 16/107,975, dated Jan. 34, 2019, 11 pages.

Non-Final Office Action from U.S. Appl. No. 16/107,979, dated Oct. 18, 2018, 14 pages.

Non-Final Office Action from U.S. Appl. No. 14/689,973, dated Jan. 25, 2017, 18 pages.

Non-Final Office Action from U.S. Appl. No. 15/699,454, dated Feb. 8, 2018, 19 pages.

Notice of Allowance from U.S. Appl. No. 16/107,972, dated May 9, 2019, 18 pages.

Notice of Allowance from U.S. Appl. No. 16/107,975, dated May 13, 2019, 18 pages.

Notice of Allowance from U.S. Appl. No. 14/689,973, dated Jul. 27, 2017, 33 pages.

Notice of Allowance from U.S. Appl. No. 15/699,454, dated Nov. 20, 2018, 6 pages.

Final Office Action, U.S. Appl. No. 14/677,493, dated Jan. 16, 2020, 16 pages.

Non-Final Office Action, U.S. Appl. No. 16/042,283, dated Jan. 24, 2020, 25 pages.

\* cited by examiner

INCIDENT RESPONSE MANAGEMENT BASED ON ASSET CONFIGURATIONS IN A COMPUTING ENVIRONMENT

RELATED APPLICATIONS

This application is a continuation of, and claims the benefit of priority to, U.S. application Ser. No. 15/699,454, filed on Sep. 8, 2017, entitled "IMPROVED INCIDENT RESPONSE USING ASSET CONFIGURATION DATA," which claims priority to U.S. application Ser. No. 14/689,973, filed on Apr. 17, 2015, entitled "INCIDENT RESPONSE AUTOMATION ENGINE," which itself claims priority to U.S. Provisional Patent Application No. 62/087,025, entitled "ACTION RECOMMENDATIONS FOR COMPUTING ASSETS BASED ON ENRICHMENT INFORMATION," filed on Dec. 3, 2014, U.S. Provisional Patent Application No. 62/106,830, entitled "ACTION RECOMMENDATIONS FOR ADMINISTRATORS IN A COMPUTING ENVIRONMENT," filed on Jan. 23, 2015, and U.S. Provisional Patent Application No. 62/106,837, entitled "SECURITY ACTIONS IN A COMPUTING ENVIRONMENT," filed on Jan. 23, 2015, all of which are hereby incorporated by reference in their entirety.

TECHNICAL FIELD

Aspects of the disclosure are related to computing environment security, and in particular to managing the allocation of security actions to computing assets with various configurations.

TECHNICAL BACKGROUND

An increasing number of data security threats exist in the modern computerized society. These threats may include viruses or other malware that attacks the local computer of the end user, or sophisticated cyber attacks to gather data and other information from the cloud or server based infrastructure. This server based infrastructure includes real and virtual computing devices that are used to provide a variety of services to user computing systems, such as data storage, cloud processing, web sites and services, amongst other possible services. To protect applications and services, various antivirus, encryption, and firewall implementations may be used across an array of operating systems, such as Linux and Microsoft Windows.

Further, some computing environments may implement security information and event management (STEM) systems and other security detection systems to provide analysis of security alerts generated by network hardware and applications. In particular, SIEM systems allow for real-time monitoring, correlation of events, notifications, and console views for end users. Further, SIEM systems may provide storage logs capable of managing historical information about various security events within the network. Although SIEMs and other security threat identifying systems may generate security alerts for devices within the network, administrators may be forced to translate each of these alerts into particular actions, which take time and resources.

Overview

The technology disclosed herein enhances how security actions are implemented within a computing environment. In one example, a method of implementing security actions for a computing environment comprising a plurality of computing assets includes identifying a security action in a command language for the computing environment. The method further provides identifying one or more computing assets related to the security action, and obtaining hardware and software characteristics for the one or more computing assets. The method also includes translating the security action in the command language to one or more action procedures based on the hardware and software characteristics, and initiating implementation of the one or more action procedures in the one or more computing assets.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

TECHNICAL DISCLOSURE

The various examples disclosed herein provide enhancements for implementing security actions in computing assets with various hardware and software configurations. In many organizations, security systems, such as security information and event management (SIEM) systems provide analysis of security alerts generated by network hardware and processes. The network hardware and processes may include routers, firewalls, operating systems and applications executing on one or more computing devices, switches, or intrusion detection systems, amongst a variety of other network devices and processes. During the analysis of the particular network, a SIEM system may identify an issue, and flag the issue as a possible security threat. Once flagged, the SIEM system may provide information to an administrator, or store information about the threat to be analyzed for a possible solution.

Here, in addition to the operations provided by the SIEM system or other security monitoring systems within a computing environment, an advisement system may be used to identify, implement, and recommend security actions to be taken against security threats. In particular, the advisement system may generate actions to be implemented in computing assets with varying software and hardware configurations. For example, a first computing asset may include a firewall from a first software distributor, while a second computing asset within the same environment may include a firewall from a second software distributor. Accordingly, to implement a security action within the first and second computing assets, the advisement system might be required to use multiple command procedures, which are specific to the firewalls on the individual computing assets.

In some implementations, the advisement system may allow administrators to provide actions in a unified command language that can be translated as necessary into the various procedures necessary for the computing assets in the environment. Consequently, rather than developing commands in each of the command languages necessary for the various assets in the environment, an administrator may use a single language for all of the assets in the environment. Referring to a firewall implementation, if an internet protocol (IP) address is to be blocked on multiple computing devices, the unified language could specify the IP address and the computing assets for the action implementation. Once specified, the command may be translated into the necessary sets of procedures to implement the IP block on the computing systems.

In some examples, the unified language for the computing environment may include various characters and symbols. However, in other implementations, the administrator may use a visual programming language to specify particular security actions. This visual programming language may include visual representations of computing assets, visual representations of communication interactions with the computing assets, or any other similar visual representation. For example, the user may select visual representations of two computing assets, and specify, via links or other symbols, that the assets should no longer communicate with one another. In some implementations, to prevent future communications the administrator may draw or connect a link on a user interface that represents a blocked communication between the two assets. However, it should be understood that to prevent future communications the user might provide a written command to implement the same action.

Figure 1:
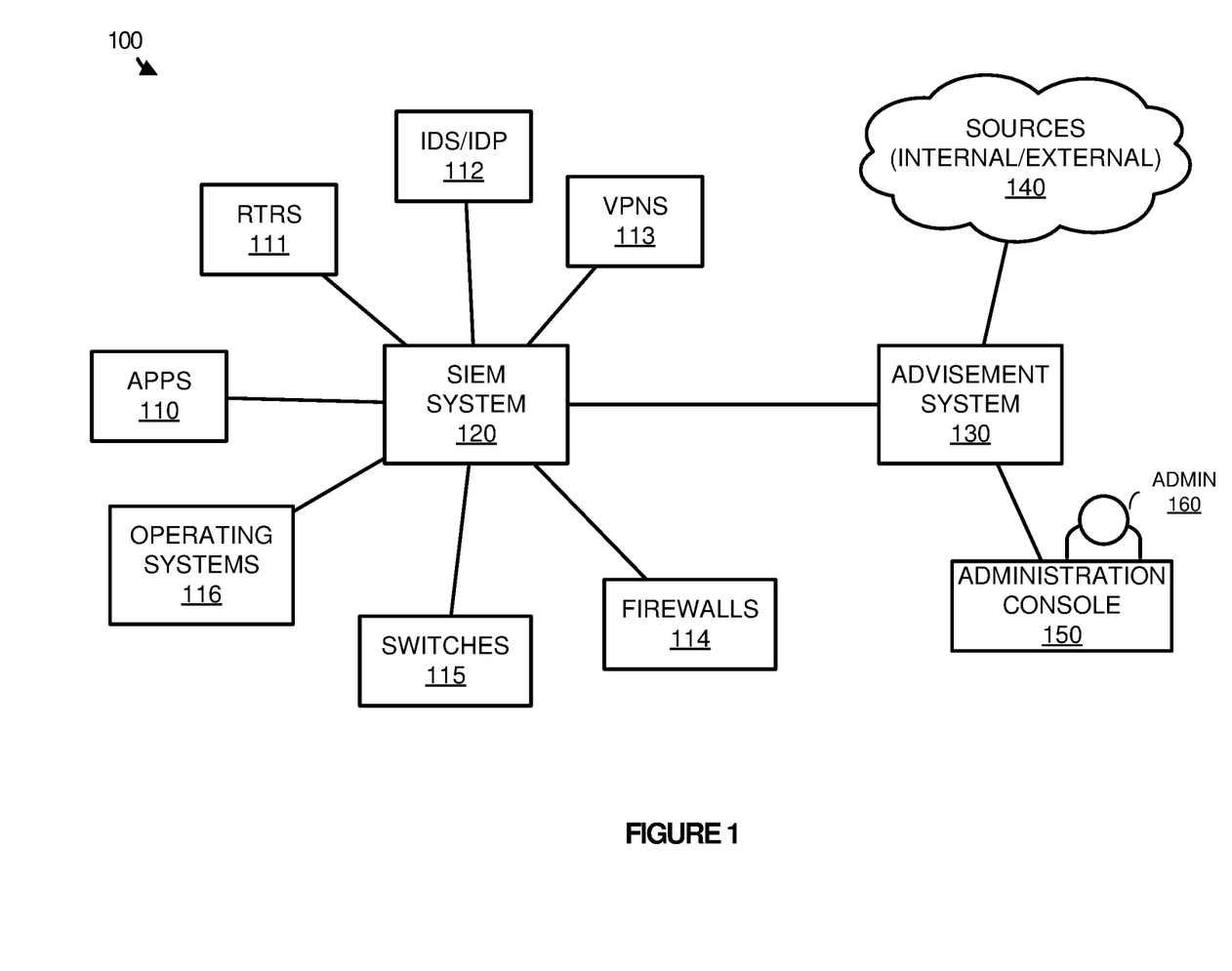
FIG. 1 illustrates a computing environment to manage security actions for a plurality of network assets.

To further illustrate the operation of an advisement system within a computing network, FIG. 1 is provided. FIG. 1 illustrates a computing environment 100 to manage security actions for a plurality of network assets. Computing environment 100 includes computing assets 110-116, STEM system 120, advisement system 130, sources 140, and administration console 150. Computing assets 110-116 include applications 110, routers 111, intrusion detection systems and intrusion prevention system (IDS/IDP) 112, virtual private networks (VPNs) 113, firewalls 114, switches 115, and operating systems 116, although other assets may exist. Assets 110-116 may execute via any number of computing systems or devices. In addition to the routers and switches, these computing devices may include server computers, desktop computers, laptop computers, tablet computers, and the like. Although not illustrated in the present example, in some implementations, assets may be defined at computing system level. Accordingly, assets may be defined as physical computing systems, such as servers, end user computing systems, host computing systems, and the like, and may further be defined as virtual processing systems, such as virtual machines or containers executing via host computing systems. These physical and virtual computing systems may include an operating system, applications, processes, firewalls, and other similar computing resources.

SIEM system 120, advisement system 130, internal and external sources 140, and administration console 150 may each include communication interfaces, network interfaces, processing systems, computer systems, microprocessors, storage systems, storage media, or some other processing devices or software systems, and can be distributed among multiple devices. SIEM system 120, advisement system 130, and sources 140 may comprise one or more server, desktop, laptop, or other similar computing devices. Administration console 150 may comprise an end user device, such as a desktop computer, laptop computer, smartphone, tablet, or any other similar computing device.

Advisement system 130 communicates with SIEM system 120, sources 140, and administration console 150 via communication links that may use Time Division Multiplex (TDM), asynchronous transfer mode (ATM), internet protocol (IP), Ethernet, synchronous optical networking (SONET), hybrid fiber-coax (HFC), circuit-switched communication signaling, wireless communications, or some other communication format, including combinations and improvements thereof. Similarly, SIEM system 120 may gather information from assets 110-116 via a plurality of communication links to the computing systems associated with the assets, wherein the links may use TDM, ATM, IP, Ethernet, SONET, HFC, circuit-switched communication signaling, wireless communications, or some other communication format, including combinations and improvements thereof. While not illustrated in the present example, it should be understood that advisement system 130 might communicate with the assets over various communication links and communication formats to implement desired security actions.

In operation, SIEM system 120 receives data and performance information from assets 110-116 and performs inspections to identify possible security issues. Once SIEM system 120 identifies a possible security threat, information about the security threat is transferred to advisement system 130. Advisement system 130 identifies the security threat and analyzes the threat using sources 140 to determine actions against the security threat. These actions might include default actions that can be initiated and implemented within the environment without interaction from an administrator, and might further include suggested actions that can be provided to administrator (admin) 160. Once the suggested actions are determined, the suggested actions are transferred, via email, text message, or other similar format, to administration console 150 to be presented to administrator 160. From the suggested actions, administrator 160 may select a particular action and advisement system 130 may implement the action within the computing environment.

In some implementations, to select a particular action, the administrator may use a unified security language to implement actions in a variety of hardware and software configurations. Once the administrator enters a command using the unified language, the language may be translated into the one or more processes or languages necessary to implement the action within the computing environment. For example, the administrator may select to remove a particular malicious process from multiple computing systems with different software configurations. Accordingly, advisement system 130 may be used to translate the command from the administrator into the necessary processes to remove each instance of the malicious process on the varying computing systems.

Figure 2:
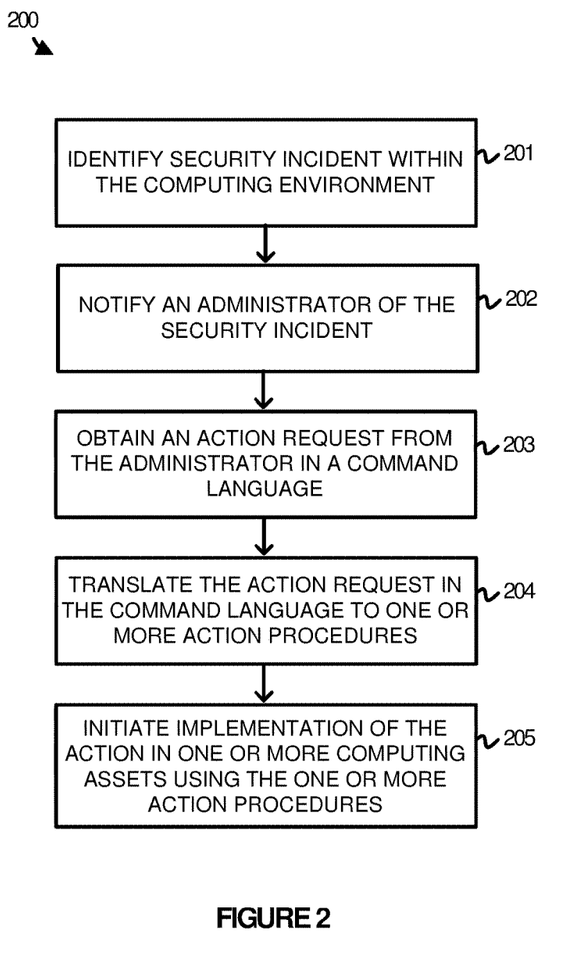
FIG. 2 illustrates a method of operating an advisement system to implement security actions.

Referring now to FIG. 2 to further demonstrate the operation of advisement system 130. FIG. 2 illustrates a method 200 of operating advisement system 130 to implement security actions. As described above in FIG. 1, SIEM system 120 receives information from a plurality of network assets 110-116 and identifies security threats to devices and systems based on the information. Once a threat is recognized, information about the threat is transferred to, and identified by, advisement system 130 (201). In response to identifying the threat, advisement system 130 notifies administrator 160 of the security incident (202). In some implementations, to notify administrator 160, advisement system 130 may provide information about the security threat, including the asset associated with the threat, the IP address associated with the threat, the severity level of the threat, the number of assets affected by the threat, or other similar information. This information may be gathered from SIEM system 120, may be gathered from the assets within computing environment 100, or may be gathered from internal and external sources 140 related to the particular incident. For example, enrichment information may be gathered from a web database regarding an unknown process executing on a computing system. In addition to or in place of the information about the threat, advisement system 130 may further provide action recommendations to administrator 160 based on gathered enrichment information. These action recommendations may include separating the affected asset from the other assets within the environment, removing a particular threat from a computing asset, blocking one or more IP addresses related to a threat, or any other similar action to protect the assets in computing environment 100.

Once the information is provided to administrator 160, advisement system 130 may obtain an action request from administrator 160 in a command language (203). As illustrated in FIG. 1, advisement system 130 may provide information to administration console 150 via a web based console, a text message, an email, or some other similar form of communication. In response to receiving the information about the threat, administrator 160 may use a command language to implement a security modification to counter the security threat. For example, the user may select to block a particular IP address from communicating with one or more assets within the environment.

Upon identifying the action request from administrator 160, advisement system 130 translates the action request in the command language to one or more action procedures (204). To translate the command, advisement system 130 may identify the hardware and software configurations for the assets associated with the action request. For example, the administrator may request that an IP address is blocked in a firewall for two computing systems. In response to the request, advisement system 130 may identify the hardware and software configurations for the two computing systems, and translate the action into procedures required by the two computing systems. Once the command is translated, advisement system 130 may initiate implementation of the action in the required computing assets using the one or more identified procedures (205).

In some examples, to implement the actions within each of the computing assets, procedures may need to be executed with indefinite time delays. For instance, to implement a firewall action within the computing environment, advisement system 130 may be required to log into the computing asset, and transfer one or more commands to the computing asset to block the required address. Accordingly, advisement system 130 may be configured to wait until each process is completed, such as waiting to be logged into the computing asset before applying the procedures necessary to block the IP address.

Although illustrated in FIG. 1 with a STEM system, it should be understood that in some examples, other systems, such as the assets themselves within the computing environment, might be used to identify security threats. Further, although illustrated separate in the example of FIG. 1, it should be understood that SIEM system 120 might reside wholly or partially on the same computing systems as advisement system 130.

Figure 3:
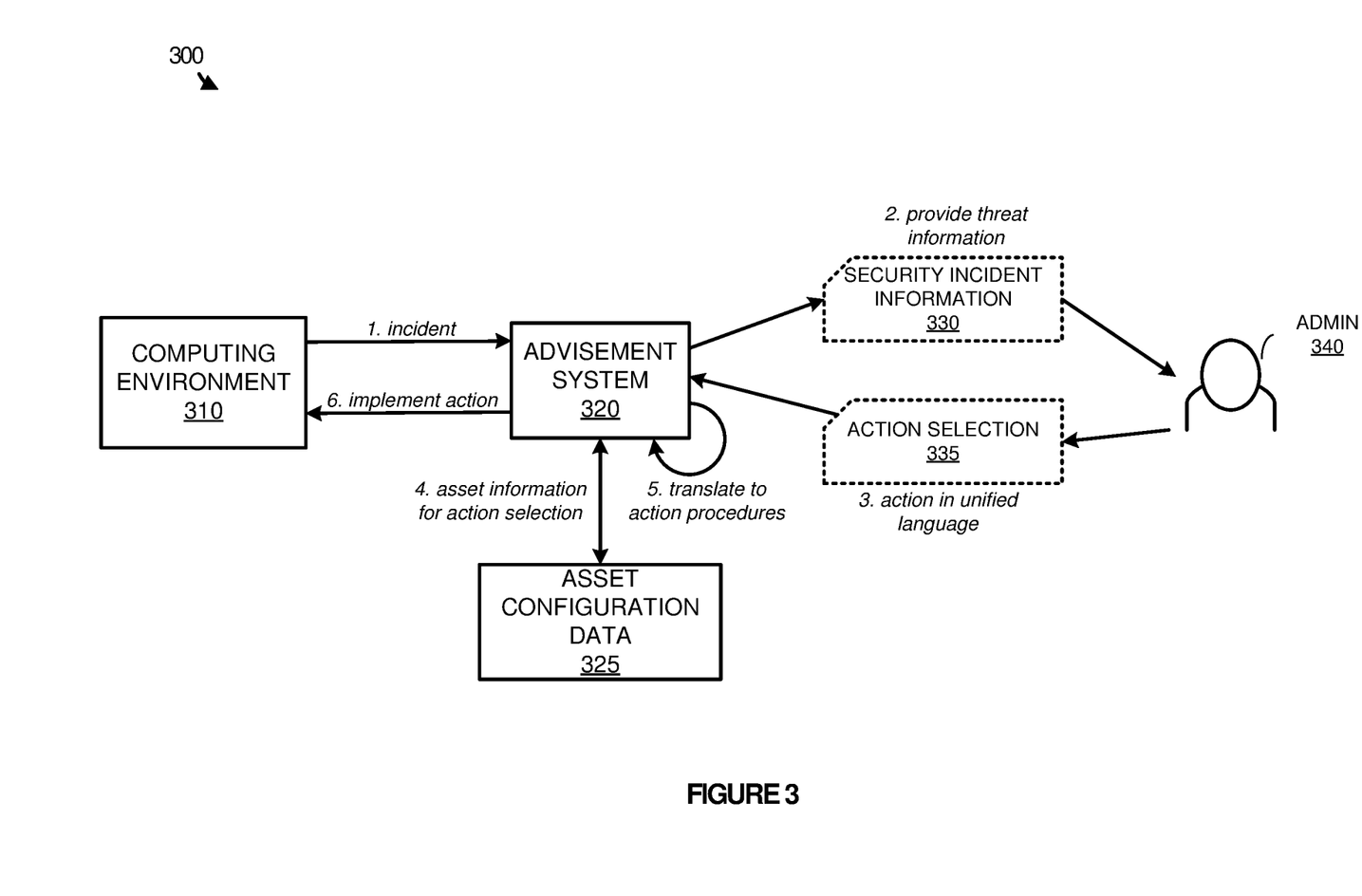
FIG. 3 illustrates an operational scenario of implementing security actions in a computing environment.

Turning to FIG. 3, FIG. 3 illustrates an operational scenario 300 of implementing security actions in a computing environment according to one implementation. Operational scenario 300 includes computing environment 310, advisement system 320, asset configuration data 325, security incident information 330, action selection 335, and administrator (admin) 340. Computing environment 310 includes a plurality of computing assets, which may comprise end user computing systems, routers, switches, firewalls, or any other similar computing asset.

As illustrated in FIG. 3, advisement system 320 initially identifies a security incident within computing environment 310. This security incident may be identified from one of the computing assets directly, or may be identified by a security monitoring system, such as SIEM systems that monitor security threats within the various computing assets. Once the incident is identified by advisement system 320, advisement system 320 may provide security incident information 330 to administrator 340. In some implementations, security incident information 330 may be provided via a user interface on advisement system 320. However, in other instances, security incident information 330 may be provided as a text message, email correspondence, web view, or other similar interface at an administration console for administrator 340. Security incident information 330 may include information about the asset affected by the threat, an IP address related to the source of the threat, information about a process related to the threat, a severity level of the threat, or some other similar information. This information may be obtained directly from the assets and security management systems, and may further be supplemented with enrichment information gathered from internal and external sources. For example, if an unknown process were identified on one of the computing assets, advisement system 320 may query a database to identify whether the process was malicious. Once the inquiry is made, the information returned from the database may be provided in security incident information 330. In some implementations, in addition to or in place of the information gathered about the threat, advisement system 320 may determine suggested actions that can be provided to administrator 340. These suggested actions may include removing a particular malicious process, entering one or more computing assets into virtual local area network (VLAN), blocking particular IP addresses, or some other similar action recommendation based on the threat and possible enrichment information.

Once security incident information 330 is provided to administrator 340, administrator 340 may generate action selection 335. Here, action selection 335 comprises a selection made in a unified command language for all assets within the environment. Once action selection 335 is identified by advisement system 320, advisement system 320 may obtain hardware and software configuration information based on the action selection. For example, action selection 335 may include a request to remove a particular process from multiple computing assets within computing environment 310. In response to the request, advisement system 320 may use asset configuration data 325 to determine software and hardware characteristics for the relevant computing assets. Once the characteristics are obtained, advisement system 320 may translate action selection 335 into one or more action procedures that correspond to the software and hardware configurations of the assets.

Returning to the example of removing a particular process from multiple computing assets, each of the computing assets may have a different hardware or software configuration. As a result, the procedures necessary to implement the action may be different for each of the assets. Rather than requiring administrator 340 to provide procedural commands for each of the computing assets, advisement system 320 may be used to translate an action selection into the commands for the various asset configurations. Upon translating action selection 335 into the required procedures, advisement system 320 may implement the action on the corresponding assets in computing environment 310.

In some examples, the procedures to implement a particular action within an asset may have indefinite time delays between each step of the procedure. For instance, to implement a firewall modification, advisement system 320 may be required to login to the relevant asset before providing commands to the asset. Accordingly, advisement system 320 may implement wait conditions that allow each step of the action procedures to be implemented without further interaction from the administrator.

Figure 4:
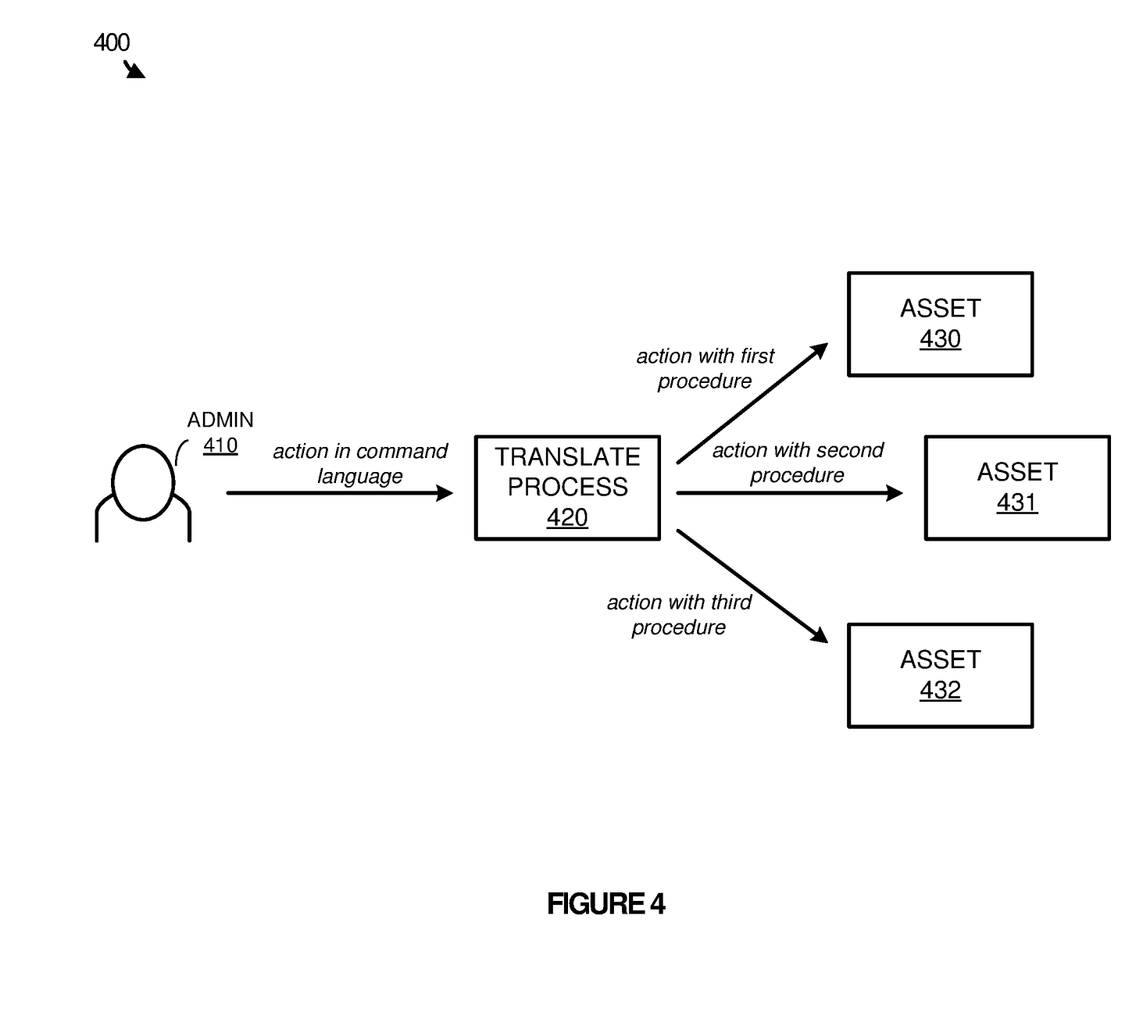
FIG. 4 illustrates a flow diagram of implementing a security action in multiple computing assets.

Turning to FIG. 4, FIG. 4 illustrates a flow diagram 400 of implementing a security action in multiple computing assets. Flow diagram 400 includes administrator 410, translate process 420, and assets 430-432. Translate process 420 is representative of a process to be implemented on advisement system 130 or advisement system 320, although translate process 420 may be implemented on other computing systems. Assets 430-432 are representative of any computing asset within a computing environment, including end user computing systems, server computing systems, routers, switches, firewalls, virtual computing elements, or any other similar asset.

As described herein, computing environments include a plurality of computing assets that may encounter security incidents. To respond to the incidents, an advisement system may provide information about the threats or incidents to administrator 410, allowing the administrator to implement an action against the threat. This information may be obtained from the individual assets, from security monitoring systems within the environment, or may be supplemented with enrichment information obtained from one or more internal or external sources. The information provided to administrator 410 may include identifiers for the assets related to the incident, IP addresses related to the incident, files or processes related to the incident, indications of the severity of the incident within the environment, or any other similar information.

Once the information is provided to administrator 410, the administrator may select an action to be taken against the threat within the environment. In particular, the administrator may use a unified command language that can be used to implement security actions across a plurality of assets within the environment, including assets with different software and/or hardware configurations. For example, the unified command language may include a structure for implementing actions within the environment, including asset identifiers for assets that require the modification, as well as one or more commands to be applied to the assets that require the modification.

Once the administrator inputs the particular action selection via a user interface on the advisement system or a separate administration console device, the advisement system identifies the action in the unified command language and translates the action to one or more action procedures based on the asset configurations. In particular, the advisement system may obtain software and hardware characteristics for each of the computing assets involved in the security action. Once the characteristics are obtained, the advisement system may translate the user generated action into the necessary procedures for the various computing assets. As depicted in FIG. 4, the action generated by administrator 410 requested modifications to assets 430-432. Accordingly, translate process 420 translates the request from the administrator in the unified language into the required procedures for assets 430-432. In the present example, each of assets 430-432 require a different set of procedures, which may occur as a result of different software or hardware configurations on the computing assets. For example, if administrator 410 desired a firewall implementation in assets 430-432, translate process 420 may translate the action into the necessary parameters and procedures for each individual firewall for the computing assets.

In some implementations, the advisement system for a computing environment may have access to a database of connectors or software modules that can be used to translate the various commands from the administrator. For example, when firewall software is distributed, a connector may be generated for the firewall that allows commands in the unified language to modify a configuration of the firewall. Accordingly, when a command is generated for an asset with the new firewall distribution, the new connector may be used to implement the required procedures.

Figure 5:
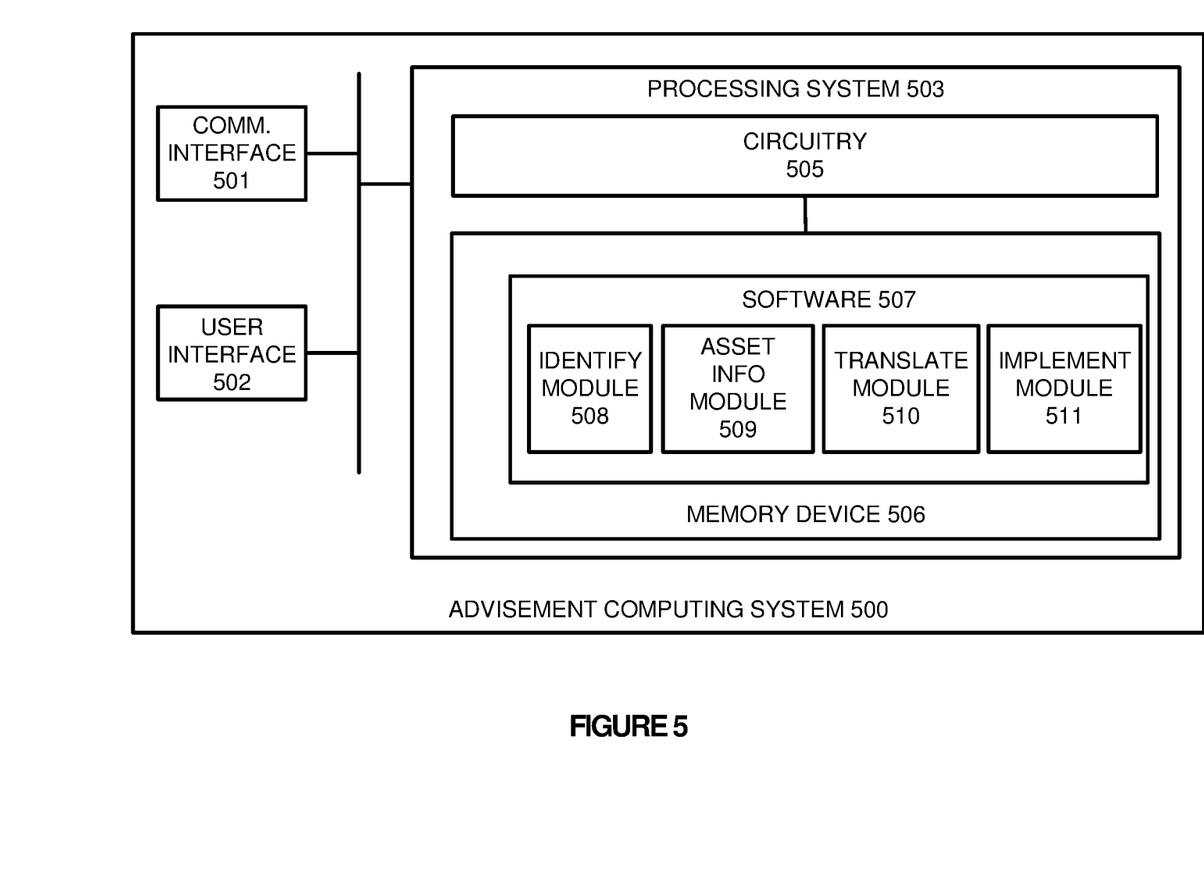
FIG. 5 illustrates an advisement computing system to implement security actions in a computing environment.

Turning to FIG. 5, FIG. 5 illustrates an advisement computing system 500 to provide action recommendations for a plurality of network assets. Advisement computing system 500 is representative of a computing system that may be employed in any computing apparatus, system, or device, or collections thereof, to suitably implement the advisement systems described herein. Computing system 500 comprises communication interface 501, user interface 502, and processing system 503. Processing system 503 is communicatively linked to communication interface 501 and user interface 502. Processing system 503 includes processing circuitry 505 and memory device 506 that stores operating software 507.

Communication interface 501 comprises components that communicate over communication links, such as network cards, ports, radio frequency (RF) transceivers, processing circuitry and software, or some other communication devices. Communication interface 501 may be configured to communicate over metallic, wireless, or optical links. Communication interface 501 may be configured to use TDM, IP, Ethernet, optical networking, wireless protocols, communication signaling, or some other communication format—including combinations thereof. In particular, communication interface 501 may communicate with security identification systems, such as SIEM systems, security monitoring processes on the assets themselves, or some other security identification system. Further, communication interface 501 may be configured to communicate with one or more administration consoles to provide the suggested actions to administrators, and may also communicate with the computing assets of the environment to implement selected actions.

User interface 502 comprises components that interact with a user. User interface 502 may include a keyboard, display screen, mouse, touch pad, or some other user input/output apparatus. User interface 502 may be omitted in some examples.

Processing circuitry 505 comprises microprocessor and other circuitry that retrieves and executes operating software 507 from memory device 506. Memory device 506 comprises a non-transitory storage medium, such as a disk drive, flash drive, data storage circuitry, or some other memory apparatus. Operating software 507 comprises computer programs, firmware, or some other form of machine-readable processing instructions. Operating software 507 includes identify module 508, asset information (info) module 509, translate module 510, and implement module 511, although any number of software modules may provide the same operation. Operating software 507 may further include an operating system, utilities, drivers, network interfaces, applications, or some other type of software. When executed by circuitry 505, operating software 507 directs processing system 503 to operate advisement computing system 500 as described herein.

In particular, identify module 508 directs processing system 503 to identify a security action in a command language for the computing environment. In response to the security action, asset info module 509 directs processing system 503 to identify one or more computing assets related to the security action, and obtain hardware and software characteristics for the one or more computing assets. Based on the hardware and software characteristics, translate module 510 directs processing system 503 to translate the security action in the command language to one or more action procedures based on the hardware and software characteristics. For example, a computing environment may include a variety of different hardware with a variety of different software configurations. Accordingly, if the security action comprised an action to be implemented across multiple devices, different procedures may be required for each of the devices. Rather than requiring an administrator to manually implement the various procedures, computing system 500 may be used to translate a security action to the required procedures for various software and hardware configurations. Once the security action is translated, implement module 511 directs processing system 503 to initiate implementation of the one or more action procedures in the one or more computing assets.

In some implementations, advisement computing system 500 may have access to one or more connectors or modules that can be used to interface with the various hardware and software within the computing environment. For example, a security action from an administrator may select to implement a firewall to be applied across multiple computing assets with multiple hardware and/or software configurations. In response to identifying the action, computing system 500 may identify hardware and software characteristics for the computing assets that require the modification, and translate the action based on the characteristics. For example, a first connector may specify the action procedures for a computing system with a first firewall distribution, whereas a second connector may specify the action procedures for a computing system with a second firewall distribution.

Although not illustrated in the present example, in some instances, advisement computing system 500 may be configured to notify an administrator of a security threat within the environment. This notification may include the identity of the asset affected by the threat, the severity of the threat within the environment, the IP address associated with the threat, the process name associated with the threat, or any other similar information. The information may be obtained directly from the assets in the environment, a security system configured to monitor for security issues within the environment, or may be obtained from internal and external sources. For example, computing system 500 may identify a security issue within the computing environment. In response to the security issue, processing system 503 may be configured to query internal and external sources for enrichment data regarding the threat. Accordingly, if an unknown process were identified as executing on a computing asset, processing system 503 may query a database to determine if the process is malicious. Once the information is retrieved, the information may be provided to the administrator with the notification, allowing the administrator to generate a security action in the environment.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method comprising:
   in response to receiving an indication of an incident in a computing environment, causing display of incident information related to the incident;
   identifying a selection of an action to be used to respond to the incident;
   identifying one or more computing assets associated with the action;
   obtaining configuration data for the one or more computing assets;
   identifying, based on the configuration data, one or more action procedures to be used to implement the action in the one or more computing assets; and
   initiating implementation of the one or more action procedures in the one or more computing assets.

2. The method of claim 1 further comprising:
   maintaining asset configuration data for computing assets in the computing environment, the asset configuration data comprising characteristics for each asset of the computing assets; and
   wherein obtaining the configuration data for the one or more computing assets comprises obtaining the configuration data for the one or more computing assets from the maintained asset configuration data.

3. The method of claim 1, wherein the incident information identifies at least one computing asset in the computing environment related to the incident.

4. The method of claim 1 further comprising obtaining at least a portion of the incident information from one or more databases or websites.

5. The method of claim 1, wherein the configuration data comprises hardware or software characteristics.

6. The method of claim 1, wherein identifying the selection of the action comprises identifying the selection of the action in a command language.

7. The method of claim 1, wherein identifying the selection of the action comprises identifying the selection of the action in a visual programming language, the visual programming language comprising one or more symbols to represent the action.

8. The method of claim 1, wherein the action comprises an action to block at least one internet protocol (IP) address, an action to remove a process on the one or more computing assets, or an action to enter the one or more computing assets into a virtual local area network (VLAN).

9. The method of claim 1, wherein the computing environment comprises a plurality of computing assets, the plurality of computing assets comprising host computing systems, end user computing systems, routers, switches, or virtual processing systems.

10. The method of claim 1, wherein the incident information comprises a suggestion of one or more actions to respond to the incident, and wherein identifying the selection of the action comprises identifying the selection of the action from the suggestion of one or more actions to respond to the incident.

11. A computing apparatus comprising:
one or more non-transitory computer readable storage media;
a processing system operatively coupled to the one or more non-transitory computer readable storage media; and
program instructions stored on the one or more non-transitory computer readable storage media that, when executed by the processing system, direct the processing system to:
in response to receiving an indication of an incident in a computing environment, causing display of incident information related to the incident;
identify a selection of an action to be used to respond to the incident;
identify one or more computing assets associated with the action;
obtain configuration data for the one or more computing assets;
identify, based on the configuration data, one or more action procedures to be used to implement the action in the one or more computing assets; and
initiate implementation of the one or more action procedures in the one or more computing assets.

12. The computing apparatus of claim 11, wherein the program instructions further direct the processing system to:
maintain asset configuration data for computing assets in the computing environment, the asset configuration data comprising characteristics for each asset of the computing assets; and
wherein obtaining the configuration data for the one or more computing assets comprises obtaining the configuration data for the one or more computing assets from the maintained asset configuration data.

13. The computing apparatus of claim 11, wherein the incident information identifies at least one computing asset in the computing environment related to the incident.

14. The computing apparatus of claim 11, wherein the program instructions further direct the processing system to obtain at least a portion of the incident information from one or more databases or websites.

15. The computing apparatus of claim 11, wherein the configuration data comprises hardware or software characteristics.

16. The computing apparatus of claim 11, wherein identifying the selection of the action comprises identifying the selection of the action in a command language.

17. The computing apparatus of claim 11, wherein identifying the selection of the action comprises identifying the selection of the action in a visual programming language, the visual programming language comprising one or more symbols to represent the action.

18. The computing apparatus of claim 11, wherein the action comprises an action to block at least one internet protocol (IP) address, an action to remove a process on the one or more computing assets, or an action to enter the one or more computing assets into a virtual local area network (VLAN).

19. The computing apparatus of claim 11, wherein the computing environment comprises a plurality of computing assets, the plurality of computing assets comprising host computing systems, end user computing systems, routers, switches, or virtual processing systems.

20. The computing apparatus of claim 11, wherein the incident information comprises a suggestion of one or more actions to respond to the incident, and wherein identifying the selection of the action comprises identifying the selection of the action from the suggestion of one or more actions to respond to the incident.

21. An apparatus comprising:
one or more non-transitory computer readable storage media;
a processing system operatively coupled to the one or more non-transitory computer readable storage media; and
program instructions stored on the one or more non-transitory computer readable storage media that, when executed by the processing system, direct the processing system to:
in response to receiving an indication of an incident in a computing environment, obtain enrichment information associated with the incident from one or more databases or websites;
determine a suggestion of one or more actions to be used to respond to the incident;
causing display of incident information related to the incident, wherein the incident information comprises at least the suggestion of the one or more actions;
identify a selection of an action from the one or more actions to be used to respond to the incident;
identify one or more computing assets associated with the action;
obtain configuration data for the one or more computing assets;
identify, based on the configuration data, one or more action procedures to be used to implement the action in the one or more computing assets; and
initiate implementation of the one or more action procedures in the one or more computing assets.

22. The apparatus of claim 21, wherein the program instructions further direct the processing system to:
maintain asset configuration data for computing assets in the computing environment, the asset configuration data comprising characteristics for each asset of the computing assets; and
wherein obtaining the configuration data for the one or more computing assets comprises obtaining the configuration data for the one or more computing assets from the maintained asset configuration data.

23. The apparatus of claim 21, wherein the incident information identifies at least one computing asset in the computing environment related to the incident.

24. The apparatus of claim 21, wherein the incident information comprises at least a portion of the enrichment information.

25. The apparatus of claim 21, wherein the configuration data comprises hardware or software characteristics.

26. The apparatus of claim 21, wherein identifying the selection of the action comprises identifying the selection of the action in a command language.

27. The apparatus of claim 21, wherein identifying the selection of the action comprises identifying the selection of the action in a visual programming language, the visual programming language comprising one or more symbols to represent the action.

28. The apparatus of claim 21, wherein the action comprises an action to block at least one internet protocol (IP) address, an action to remove a process on the one or more computing assets, or an action to enter the one or more computing assets into a virtual local area network (VLAN).

29. The apparatus of claim 21, wherein the computing environment comprises a plurality of computing assets, the plurality of computing assets comprising host computing systems, end user computing systems, routers, switches, or virtual processing systems.

30. The apparatus of claim 21, wherein the incident information comprises one or more internet protocol addresses or processes associated with the incident.

* * * * *